United States Patent
Takagi et al.

(10) Patent No.: US 6,385,158 B1
(45) Date of Patent: May 7, 2002

(54) OPTICAL PICKUP DEVICE HAVING COMPATIBILITY WITH TRACKING SYSTEM, AND OPTICAL DISK RECORDING/REPRODUCTION APPARATUS USING THE SAME

(75) Inventors: Naoyuki Takagi; Satoshi Sumi, both of Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/168,880

(22) Filed: Oct. 9, 1998

(30) Foreign Application Priority Data

Oct. 29, 1997 (JP) .............................................. 9-297278

(51) Int. Cl.$^7$ ................................................ G11B 7/00
(52) U.S. Cl. ............................. 369/112.16; 369/110.02; 369/100; 369/53.22
(58) Field of Search ................................ 369/112, 100, 369/110, 109, 118, 94, 58, 44.23, 44.24

(56) References Cited

U.S. PATENT DOCUMENTS

| | | | | |
|---|---|---|---|---|
| 5,745,465 A | * | 4/1998 | Tsai et al. | 369/110 |
| 5,757,742 A | * | 5/1998 | Akiba et al. | 369/44.23 |
| 5,802,029 A | * | 9/1998 | Zucker | 369/58 |
| 5,909,416 A | * | 6/1999 | Matsui | 369/44.41 |
| 5,912,868 A | * | 6/1999 | Hayashi et al. | 369/94 |
| 5,914,926 A | * | 6/1999 | Maeno et al. | 369/112 |
| 5,917,798 A | * | 6/1999 | Horimai et al. | 369/110 |
| 5,923,626 A | * | 7/1999 | Richter | 369/44.23 |
| 5,930,219 A | * | 7/1999 | Kim | 369/109 |
| 5,936,920 A | * | 8/1999 | Noda | 369/44.37 |
| 5,974,020 A | * | 10/1999 | Ju et al. | 369/94 |
| 6,049,518 A | * | 4/2000 | Tsuchiya et al. | 369/118 |
| 6,078,554 A | * | 6/2000 | Ootaki et al. | 369/44.23 |
| 6,088,317 A | * | 7/2000 | Kim et al. | 369/54 |

FOREIGN PATENT DOCUMENTS

| | | | |
|---|---|---|---|
| JP | 61-148634 | 7/1986 | |
| JP | 61-233437 | 10/1986 | |
| JP | 3-225636 | 10/1991 | |
| JP | 4-57224 | 2/1992 | |
| JP | 4-57225 | 2/1992 | |
| JP | 6-242315 | 9/1994 | |
| JP | 8-30993 | 2/1996 | |
| JP | 8-87760 | 4/1996 | |
| JP | 8-329490 | 12/1996 | |
| JP | 8-339556 | 12/1996 | |
| JP | 9-198702 | 7/1997 | |
| JP | 9-204703 | 8/1997 | |
| JP | 9-204705 | 8/1997 | |
| JP | 9-212868 | 8/1997 | |
| JP | 9-245356 | 9/1997 | |
| JP | 9-259461 | * 10/1997 | 369/44.23 |
| JP | 9-265722 | 10/1997 | |
| JP | 10-199024 | * 7/1998 | 369/112 |
| JP | 11-66602 | 3/1999 | |

OTHER PUBLICATIONS

Copy of Japanese Patent Office Action for corresponding Japanese Patent Application No. 9–297278 dated Nov. 21, 2000 with translation.

* cited by examiner

*Primary Examiner*—Nabil Hindi
(74) *Attorney, Agent, or Firm*—Armstrong, Westerman & Hattori, LLP

(57) ABSTRACT

An optical pickup device for an AS-MO disk, a DVD and a CD includes a dual wavelength semiconductor laser with first and second oscillation devices, a polarization plane rotary unit selectively rotating a plane of polarization of a laser beam 90°, and a polarization selective diffraction grating passing a laser beam straight forward or dividing a laser beam into three beams depending upon the direction of polarization. The optical pickup device operates by the DPP tracking system where three laser beams are directed for an AS-MO disk, and by the DPD tracking system where a single laser beam is directed for a DVD or a CD. As a result, a signal can be reproduced from an AS-MO disk, a DVD, or a CD having different tracking systems.

12 Claims, 12 Drawing Sheets

OPTICAL PICKUP DEVICE HAVING COMPATIBILITY WITH TRACKING SYSTEM, AND OPTICAL DISK RECORDING/ REPRODUCTION APPARATUS USING THE SAME

BACKGROUND OF THE INVENTION

1. Field of the Invention

The present invention relates to an optical pickup device and optical disk recording/reproduction apparatus using the same. More particularly, the present invention relates to an optical pickup device that can reproduce a signal from a plurality of types of optical disks differing in the tracking system standard, and an optical disk recording/reproduction apparatus using the same.

2. Description of the Background Art

An optical disk recording/reproduction apparatus that reproduces a signal from an optical disk of a large storage capacity such as a CD-ROM (Compact Disk as Read-Only Memory) or an MO (Magneto Optical) disk, and that records a signal on an optical disk is used as an external storage device of a computer.

Data is recorded onto such optical disks by change in the configuration or the magnetic property on the recording face of the optical disk. The recorded data is reproduced by irradiating a laser beam onto the recording face of the optical disk and detecting reflected light therefrom.

In accordance with the requirement of higher density of information in an optical disk and the recording/ reproduction of information including both video and audio data, a DVD (Digital Video Disk) is produced. Also, the standard for a new optical disk called an AS-MO (Advanced Storage-Magneto Optical) disk is being developed.

Similar to a conventional MO disk, an AS-MO disk has data recorded on an optical disk by heat caused by a laser beam and usage of the external magnetic field. Data is reproduced from an AS-MO disk by detecting the magnetic property recorded according to data using a laser beam through the magneto optical effect. The address on the recording face of the optical disk where data is stored is represented by altering the configuration and arrangement of the pits formed on the recording face in a conventional MO disk whereas the configuration of the wobble formed on the recording face is altered in an AS-MO disk.

In a general CD (CD-ROM as well as audio CD) and DVD, the DPD (Differential Phase Detection) method is used for the tracking system in tracing accurately the track of an optical disk with a laser beam. In an AS-MO disk, a DPP (Differential Push-Pull) method is employed. In contrast to the DPD method in which a single laser beam is directed onto the recording face of the optical disk, three laser beams are used in the DPP method. More specifically, the laser beam is divided into one main laser beam and two sub laser beams to be directed onto the recording face of the optical disk according to the DPP method. Therefore, tracking control is carried out by detecting the phase difference of the optical signal in a single laser beam reflected from the recording face of the optical disk in the DPD method. In the DPP method, tracking control is carried out by detecting the balance of the quantity of light of the main laser beam and the two sub laser beams, respectively.

Since the tracking system differs depending upon the AS-MO disk, DVD, and CD standard, a signal cannot be reproduced from all the optical disks with one pickup device. The user must have a plurality of optical disks recording/reproduction apparatuses dedicated for each of the AS-MO disk, DVD, CD, and the like corresponding to the various standards of the optical disk. The user had to select an appropriate apparatus corresponding to the optical disk for every reproduction operation.

SUMMARY OF THE INVENTION

A main object of the present invention is to provide an optical pickup device having compatability with respect to a plurality of types of optical disks differing in the tracking system, and an optical disk recording/reproduction apparatus including such an optical pickup device.

According to an aspect of the present invention, an optical pickup device for a first optical disk by a first standard and for a second optical disk by a second standard differing from the first standard includes a laser and an optical device. The optical device passes the laser beam from the laser to form one main laser beam when reproducing a signal from the first optical disk, and passes the laser beam from the laser to form one main laser beam and simultaneously diffracts that laser beam to form first and second sub laser beams when reproducing a signal from the second optical disk.

Preferably, the optical device includes a polarization selective diffraction grating that passes a laser beam that is polarized in a first direction to form one main laser beam, and that passes a laser beam that is polarized in a second direction differing from the first direction to form one main laser beam and simultaneously diffracting that laser beam to form first and second sub laser beams.

Preferably, the optical pickup device further includes a polarization plane rotary unit. The polarization plane rotary unit is arranged between the laser and the polarization selective diffraction grating to selectively rotate the plane of polarization of the laser beam from the laser.

The optical pickup device can reproduced a signal from a plurality of types of optical disks differing in standard since the tracking system can be switched between a one beam system and a three beam system.

The optical pickup device can reliably switch the tracking system without mechanical operation by virtue of the usage of a polarization selective diffraction grating that forms one or three laser beams.

Since a polarization plane rotary unit that selectively rotates the plane of polarization of an incident laser beam to the polarization selective diffraction grating is used, the optical pickup device can switch the tracking system by altering the direction of polarization of the laser beam.

According to another aspect of the present invention, an optical disk recording/reproduction apparatus includes the above optical pickup device. The optical pickup device further includes a photodetector detecting the laser beam reflected from the optical disk. The photodetector includes a main sensor detecting a main laser beam, a first sub sensor detecting a first sub laser beam, and a second sub sensor detecting a second sub laser beam. The optical disk recording/reproduction apparatus further includes a first generation circuit, a second generation circuit, and a servo mechanism. The first generation circuit generates a first tracking error signal in response to an output signal from the main sensor. The second generation circuit generates a second tracking error signal in response to the output signals from the main sensor and the first and second sub sensors. The servo mechanism shifts the optical pickup device in a direction substantially perpendicular to the track on the optical disk in response to first or second tracking error signals.

Preferably, the optical disk recording/reproduction apparatus further includes a discrimination circuit, and a switching element. The discrimination circuit discriminates between fist and second optical disks. The switching element selects a first or second tracking signal according to the discrimination result of the discrimination circuit and supplies the selected signal to the servo mechanism.

In the optical disk recording/reproduction apparatus, the laser beam reflected from the optical disk is detected by the main sensor in the photodetector when in the one beam system mode. In the three beam system mode, the main laser beam reflected at the optical disk is detected by the main sensor of the photodetector, and the first and second sub laser beams reflected at the optical disks are detected by the first and second sub sensors, respectively. The optical disk recording/reproduction apparatus can control the optical pickup device by a tracking system corresponding to the type of the optical disk since the circuit generating a tracking error signal is switched according to the tracking system of the optical pickup device.

Also, the tracking system can be switched automatically according to the optical disk since the optical disk recording/reproduction apparatus includes a discrimination circuit that distinguishes the optical disk.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
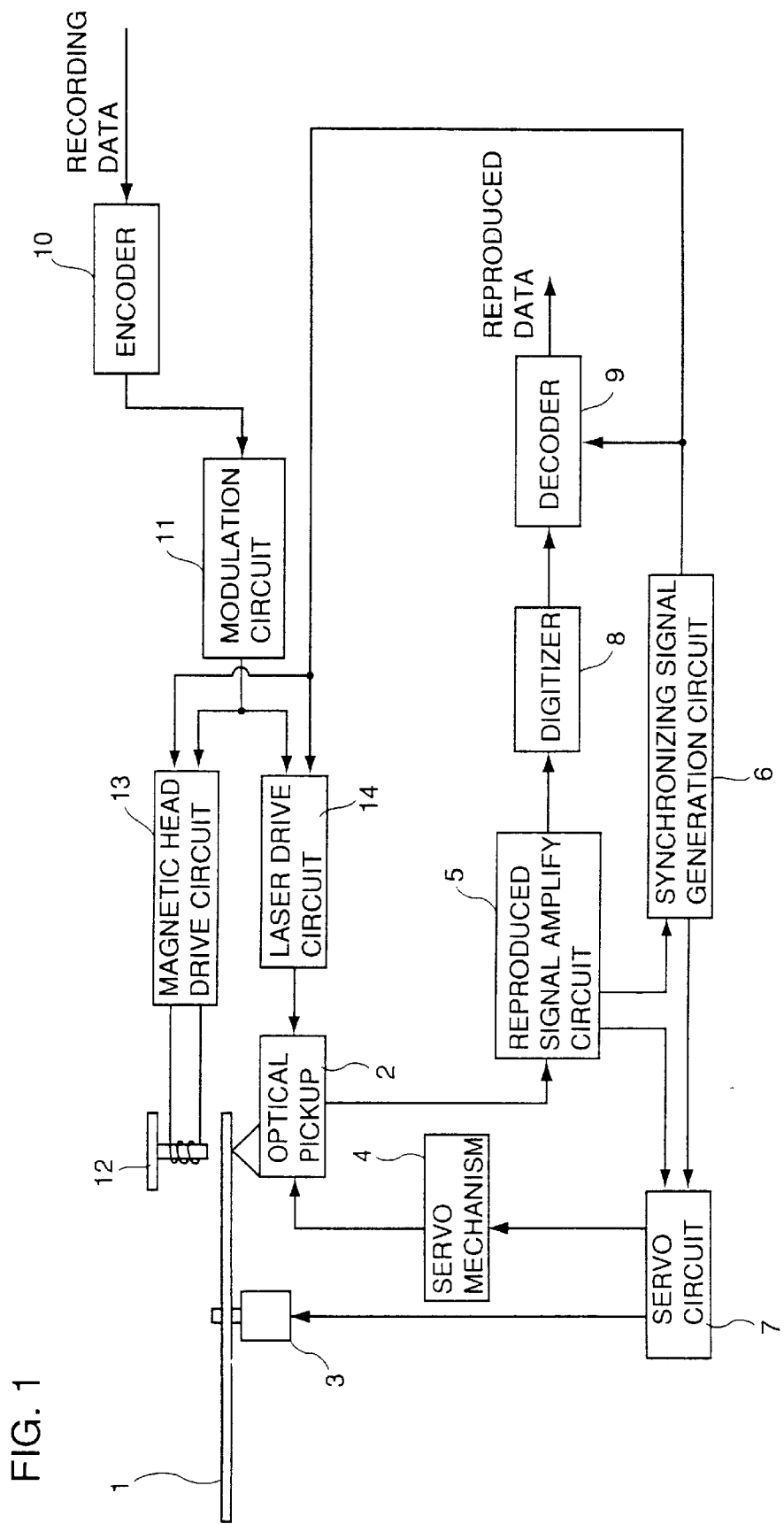
FIG. 1 is a block diagram showing a structure of an optical disk recording/reproduction apparatus according to an embodiment of the present invention.

An embodiment of the present invention will be described in detail hereinafter with reference to the drawings. In the drawings, the same or corresponding components have the same reference characters allotted, and their description will not be repeated.

[Structure of Optical Disk Recording/Reproduction Apparatus]

An optical disk recording/reproduction apparatus according to an embodiment of the present invention records a signal on an AS-MO disk, a DVD, and a CD (including CD-ROM and audio CD), and reproduces a signal from these disks. As shown in FIG. 1, the optical disk recording/reproduction apparatus includes an optical pickup device 2 for reproducing a signal from an optical disk 1, a spindle motor 3 rotating optical disk 1, a servo mechanism 4 providing control of focusing servo and tracking servo of optical pickup device 2, a reproduced signal amplify circuit 5 amplifying a signal (clock signal, address signal, data signal, focus error signal, tracking error signal, and the like) reproduced by optical pickup device 2, a synchronizing signal generation circuit 6 generating a synchronizing signal in response to a clock signal from amplify circuit 5, and a servo circuit 7 controlling motor 3 in response to a clock signal from amplify circuit 5 or a synchronizing signal from synchronizing signal generation circuit 6, and controlling servo mechanism 4 in response to a focus error signal and a tracking error signal from amplify circuit 5.

The recording/reproduction apparatus further includes a digitizer (waveform shaper) 8 to binarize a data signal from amplify circuit 5, a decoder 9 for decoding a data signal from digitizer 8 in response to a synchronizing signal, an encoder 10 for encoding a data signal to be recorded, a modulation circuit 11 for modulating a data signal from encoder 10 by a predetermined system, a magnetic head 12 applying a magnetic field to optical disk 1, a magnetic head drive circuit 13 driving magnetic head 12, and a laser drive circuit 14 driving the laser in optical pickup device 2. In the case of the so-called light modulation system, magnetic head drive circuit 13 drives magnetic head 12 to apply a constant magnetic field. Laser drive circuit 14 drives the laser in response to a synchronizing signal and the data signal from modulation circuit 11. In the case of the so-called magnetic field modulation system, laser drive circuit 14 drives the laser so as to direct a constant laser beam onto optical disk 1. Magnetic head drive circuit 13 drives magnetic head 12 in response to a synchronizing signal and a data signal from modulation circuit 11.

Figure 2:
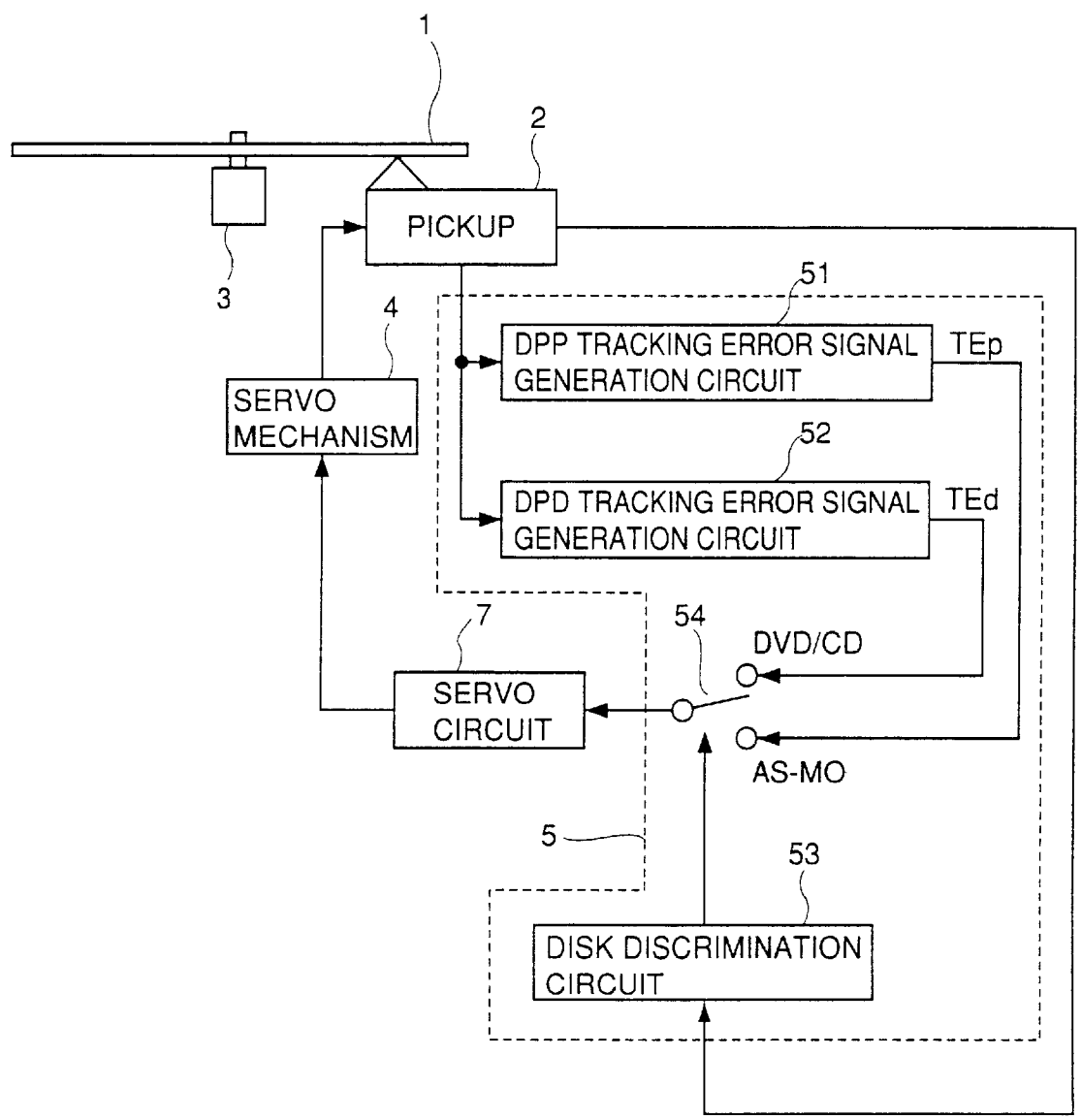
FIG. 2 is a block diagram showing a main structure of the recording/reproduction apparatus of FIG. 1.

Reproduced signal amplify circuit 5 mainly includes, as shown in FIG. 2, a DPP tracking error signal generation circuit 51, a DPD tracking error signal generation circuit 52, a disk discrimination circuit 53, and a switching element 54. Generation circuit 51 generates a tracking error signal TEp according to the DPP method on the basis of a signal reproduced from optical pickup device 2. Generation circuit 52 generates a tracking error signal TEd according to the DPD system on the basis of a signal reproduced by optical pickup device 2. Disk discrimination circuit 53 determines whether optical disk 1 is an AS-MO disk, a DVD, or a CD according to the signal reproduced by optical pickup device 2. Switching element 54 selects tracking error signal TEp or TEd according to the discrimination result by discrimination circuit 53 to supply the selected tracking error signal to servo mechanism 4 via servo circuit 7. When an AS-MO disk is mounted to spindle motor 3, discrimination circuit 53 controls switching element 54 to select tracking error signal TEp since optical pickup device 2 employs the DPP tracking system, as described later. When a DVD or a CD is mounted, discrimination circuit 53 controls switching element 54 to select tracking error signal TEd since optical pickup device 2 employs the DPD tracking system. Therefore, servo mechanism 4 responds to tracking error signal TEp or TEd to shift optical pickup device 2 in a direction substantially perpendicular to the track of optical disk 1 (in the direction of the radius). Thus, optical pickup device 2 constantly directs a laser beam on the track.

The discrimination of an AS-MO disk, a DVD, or a CD by disk discrimination circuit 53 is carried out by detecting the reflected laser beam of a wavelength of, for example, 635 nm projected onto optical disk 1. An AS-MO disk has a reflectivity of 25% for the laser beam with the wavelength of 635 nm. A DVD or a CD has a reflectivity of at least 60–70% for the laser beam with the wavelength of 635 nm. The discrimination between a DVD or a CD is effected by detecting the difference in the focus error signal. The details of this disk discrimination method is disclosed in copending U.S. patent application Ser. No. 08/689,019 filed on Jul. 30, 1996 (Japanese Patent Laying-Open Nos. 9-265722, 9-212868, 9-204705, and 9-204703), incorporated herein by reference.

Figure 3:
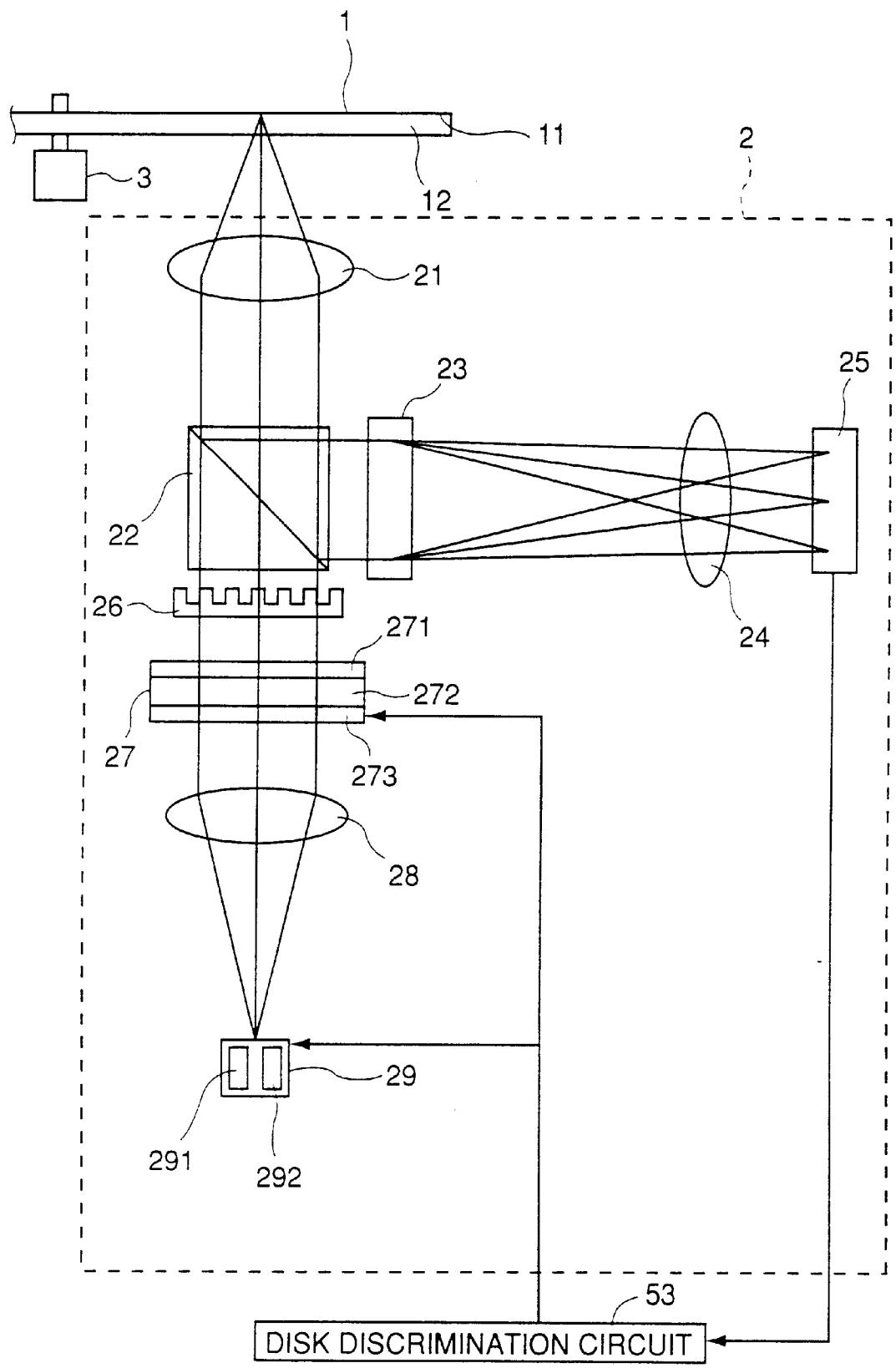
FIG. 3 shows an optical system of the optical pickup device of FIGS. 1 and 2.

As shown in FIG. 3, optical pickup device 2 includes an objective lens 21, a half mirror 22, a Wollaston prism 23, a collective lens 24, a photodetector 25, a polarization selective diffraction grating 26, a polarization plane rotary unit 27, a collimator lens 28, and a dual wavelength semiconductor laser 29.

Semiconductor laser 29 includes an oscillation device 291 oscillating a laser beam of 635 nm in wavelength for an AS-MO disk or a DVD, and an oscillation device 292 oscillating a laser beam of 780 nm in wavelength for a CD. A laser beam having a wavelength of 635 nm is polarized in a direction perpendicular to the paper plane of FIG. 3. A laser beam having a wavelength of 780 nm is polarized in a direction parallel to the paper plane of FIG. 3. Collimator lens 28 renders the laser beam from laser 29 parallel.

Polarization plane rotary unit 27 passes the laser beam from collimator lens 28 without rotating the plane of polarization of the laser beam in the case of a DVD, and passes the laser beam rotating the plane of polarization of the laser beam from collimator lens 28 substantially 90° in the case of an AS-MO disk or a CD.

Polarization selective diffraction grating 26 passes the laser beam that is polarized in a direction perpendicular to the paper plane from polarization plane rotary unit 27 to form one main laser beam, and passes the laser beam that is polarized in a direction parallel to the paper plane from polarization plane rotary unit 27 to form one main laser beam and simultaneously diffracts that laser beam to form two sub laser beams.

Objective lens 21 focuses the laser beam from diffraction grating 26 onto a signal recording face 11 via a transparent substrate 12 of optical disk 1.

Half mirror 22 passes the laser beam from diffraction grating 26 and also reflects the laser beam from signal recording face 11 perpendicularly. Wollaston prism 23 divides the laser beam polarized in a predetermined direction from half mirror 22 into three laser beams, i.e., a laser beam having only a P polarization component, a laser beam having only an S polarization component, and a laser beam having both the P and S polarization components. Collective lens 24 gathers the laser beam from Wollaston prism 23 onto photodetector 25. Photodetector 25 detects the laser beam reflected from optical disk 1.

Figure 4:
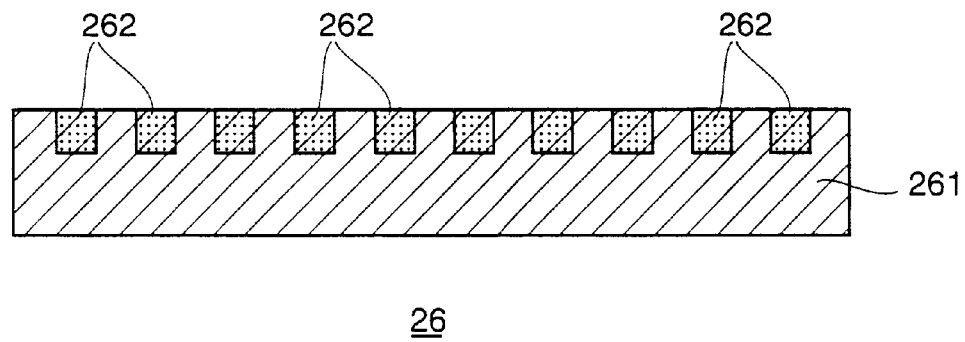
FIG. 4 is a sectional view of the polarization selective diffraction grating of FIG. 3.

Referring to FIG. 4, polarization selective diffraction grating 26 includes a glass substrate 261, and a grating region 262 formed at a predetermined interval on glass substrate 261. Grating region 262 is formed by injecting proton ($H^+$) into glass substrate 261 by, for example, the photoresist method. Diffraction grating 26 functions or not functions as a diffraction grating depending upon the direction of polarization of the incident laser beam.

Figure 5:
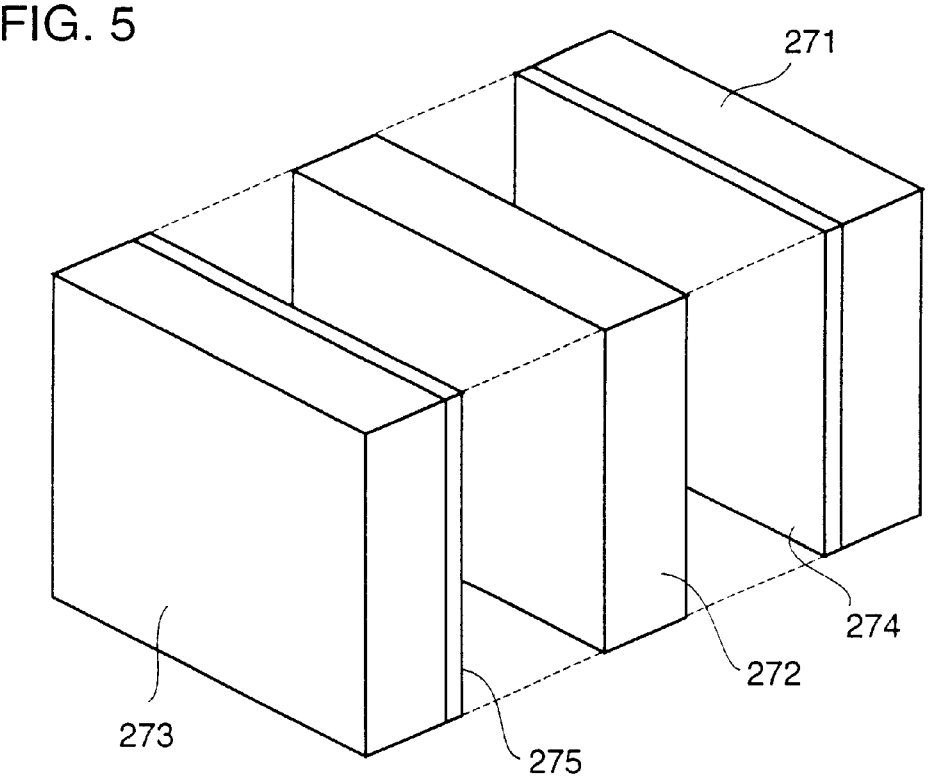
FIG. 5 is an exploded perspective view of the polarization plane rotary unit of FIG. 3.

Referring to FIG. 5, polarization plane rotary unit 27 includes glass plates 271 and 273 opposite to each other, a transparent electrode 274 formed on the inside surface of glass plate 271, a transparent electrode 275 formed on the inside surface of glass plate 273, and a TN (twisted nematic) type liquid crystal 272 sandwiched between transparent electrodes 274 and 275. Liquid crystal 272 functions to rotate the plane of polarization of the incident laser beam approximately 90° when a voltage is not applied across transparent electrodes 274 and 275, and to pass the laser beam without rotating the plane of polarization when a voltage is applied. Therefore, disk discrimination circuit 53 shown in FIGS. 2 and 3 apply a voltage across transparent electrodes 274 and 275 for a DVD, and does not apply a voltage for an AS-MO disk or a CD.

Figure 6:
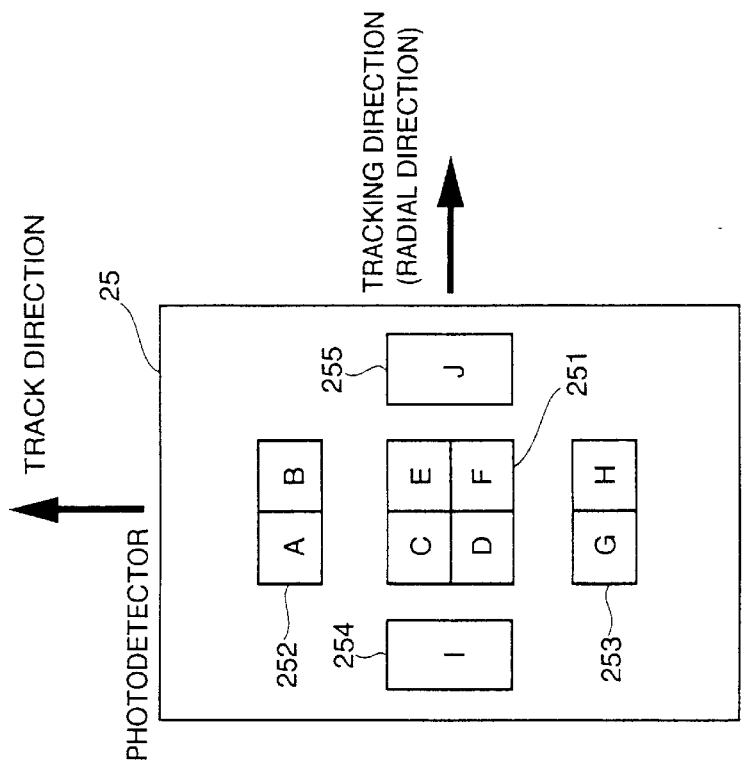
FIG. 6 is a plan view of the photodetector of FIG. 3.

Referring to FIG. 6, photodetector 25 includes a main sensor 251 detecting the center main laser beam, sub sensors 252 and 253 detecting the two sub laser beams at both sides of the main laser beam, a P polarization sensor 254 detecting a P polarized laser beam from Wollaston prism 23, and an S polarization sensor 255 detecting an S polarized laser beam from Wollaston prism 23. Sub sensors 252 and 253 are arranged in the track direction (the running direction of track; the tangential direction of track). P polarization sensor 254 and S polarization sensor 255 are arranged in the tracking direction (the direction traversing the track; radial direction). Main sensor 251 is divided into four sensors (C, D, E, F). Sub sensors 252 is divided into two sensors (A, B). Sub sensor 253 is divided into two sensors (G, H).

Figure 7:
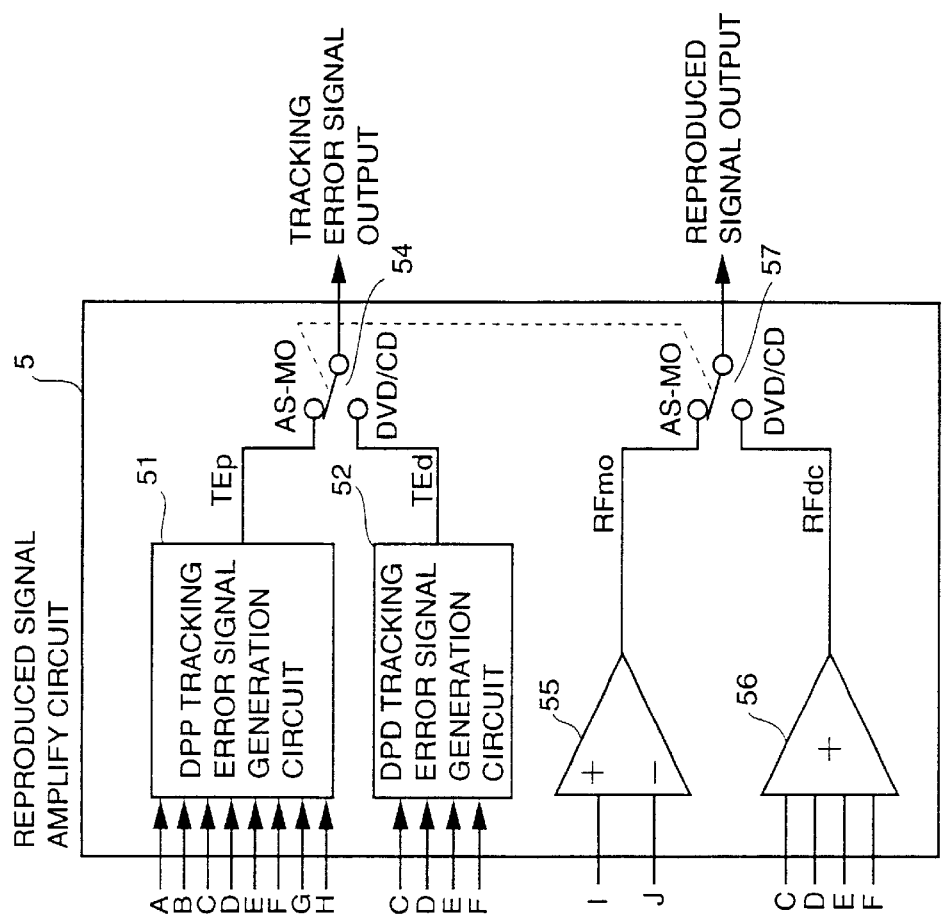
FIG. 7 is a block diagram showing a main structure of the reproduced signal amplify circuit of FIG. 1.

Referring to FIG. 7, DPP tracking error signal generation circuit 51 generates tracking error signal TEp according to detection signals A–H from main sensor 251 and sub sensors 252 and 253. DPD tracking error signal generation circuit 52 generates tracking error signal TEd according to detection signals C–F from main sensor 21.

Reproduced signal amplify circuit 5 further includes a subtractor 55, an adder 56, and a switching element 57. Subtractor 55 generates a reproduced signal RFmo (=I–J) such as a data signal according to detection signals I and J from P polarization sensor 254 and S polarization sensor 255. Adder 56 generates a reproduced signal RFdc (=C+D+ E+F) according to detection signals C–F from main sensor 251. Switching element 57 selects reproduced signal RFmo for an AS-MO disk, and reproduced signal RFdc for a DVD or a CD to supply the selected reproduced signal to shaper 8 of FIG. 1. In other words, switching element 57 operates in synchronization with the above-described switching element 54. The level of reproduced signal RFmo is proportional to the Kerr angle when the laser beam is reflected from an AS-MO disk. The level of reproduced signal RFdc is proportional to the total quantity of light of the laser beam reflected from a DVD or a CD.

Figure 8:
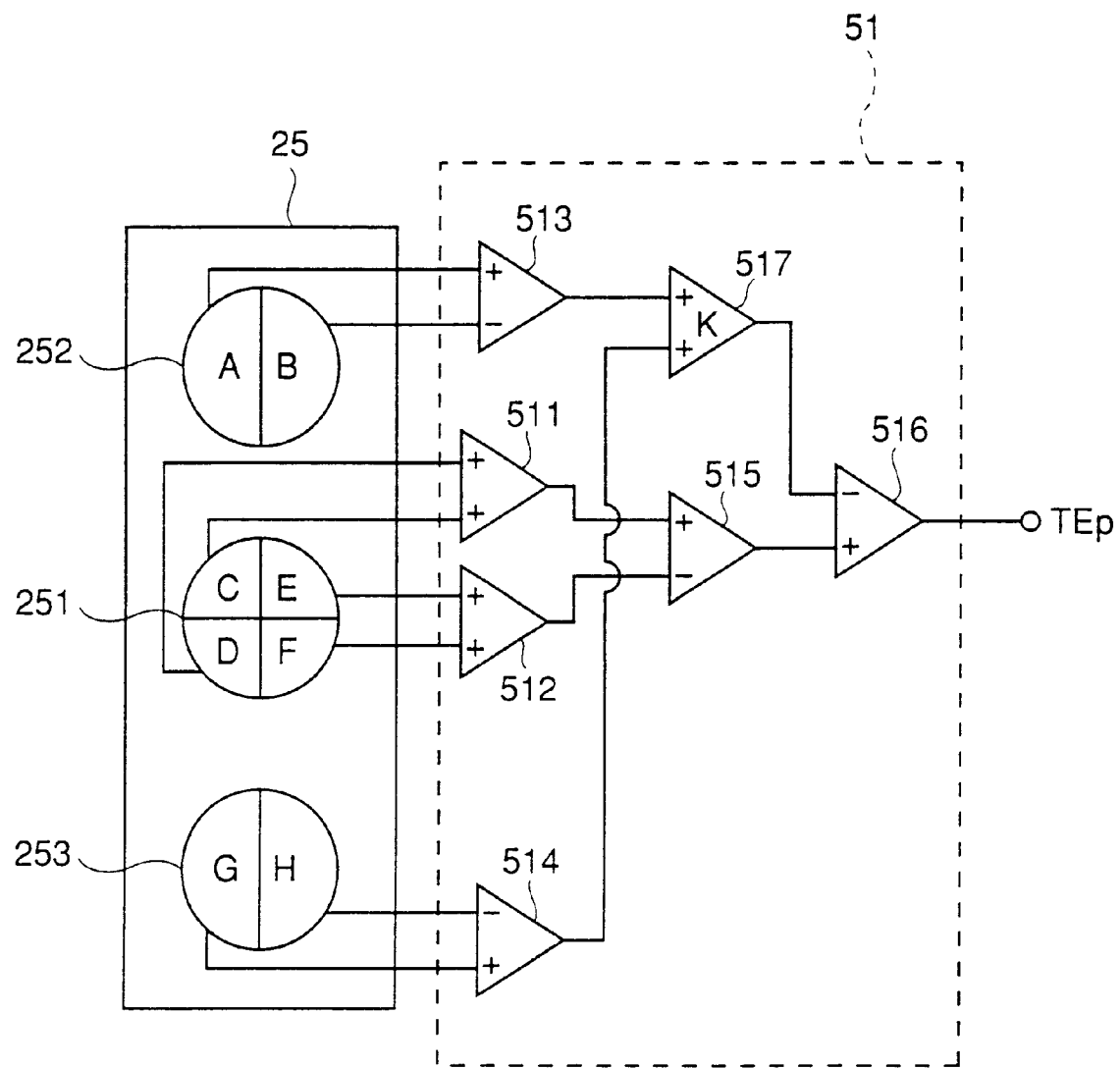
FIG. 8 is a circuit diagram showing a structure of a DPP tracking error signal generation circuit of FIGS. 2 and 7.

Referring to FIG. 8, DPP tracking error signal generation circuit 51 includes adders 511 and 512, subtractors 513–516, and, an adder 517 with a coefficient K. Tracking error signal TEp generated by generation circuit 51 is represented by the following equation (1) using detection signals A–H from sensors 251–253.

$$TEp=(C+D)-(E+F)-k\{(A-B)+(G-H)\} \quad (1)$$

where k is the coefficient of adder 517.

Figure 9:
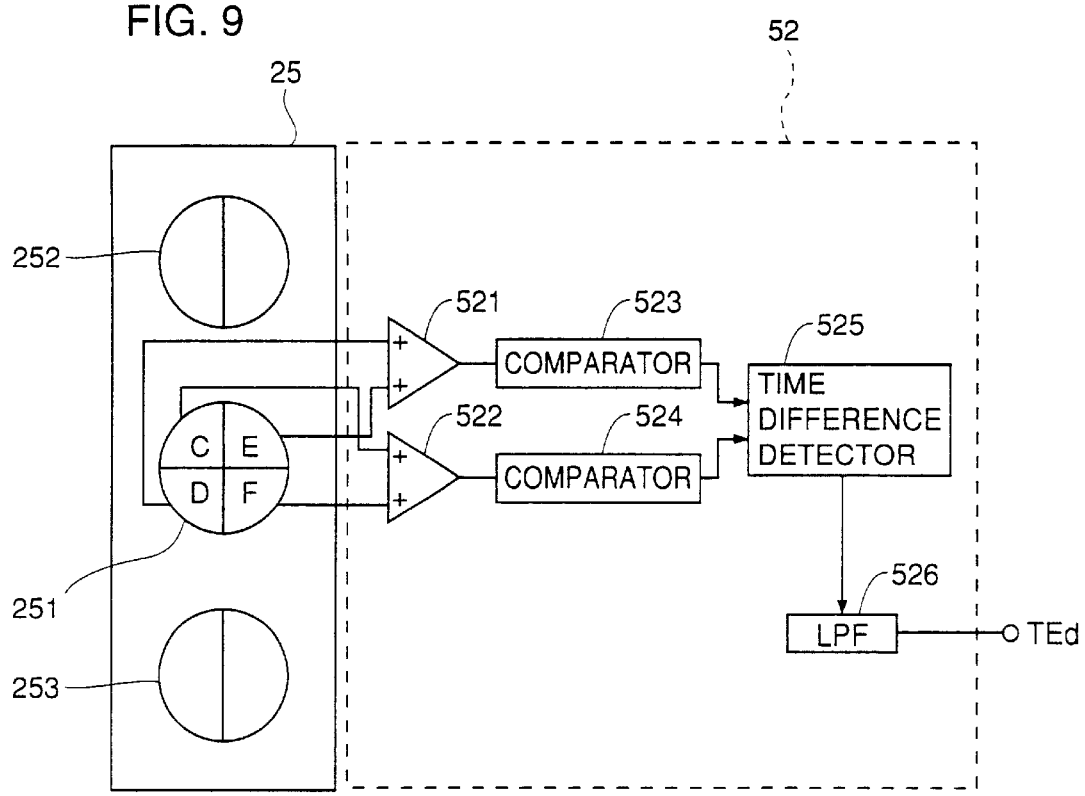
FIG. 9 is a block diagram showing a structure of a DPD tracking error signal generation circuit of FIGS. 2 and 7.

Referring to FIG. 9, DPD tracking error signal generation circuit 52 includes adders 521 and 522, comparators 523 and 524, a time difference detector 525, and a low pass filter 526. In signal generation circuit 52, a signal (D+E) is generated by adder 521 and a signal (C+F) is generated by adder 522. Signal (D+E) has its level compared with a predetermined reference level by comparator 523 to be binarized. Signal (C+F) is compared with a predetermined reference level by comparator 524 to be binarized. Time difference detector 525 detects the time difference between binarized signals (D+E) and (C+F) to output the detected result as tracking error signal TEd via low pass filter 526. It is to be noted that generation circuit 52 does not use the detection signals (A, B, G, H) from sub sensors 252 and 253 to generate tracking error signal TEd.

[Operation of Optical Disk Recording/Reproduction Apparatus]

The operation of an optical disk recording/reproduction apparatus of the above-structure will be described hereinafter. The following table indicates the tracking system, number of beams, and the laser wavelength according to the current standards of the AS-MO disk, the DVD, and the CD.

| Optical Disk | Tracking System | Number of Beams | Laser Wavelength (um) |
|---|---|---|---|
| AS-MO | DPP | 3 | 635 |
| DVD | DPD | 1 | |
| CD | | | 780 |

It is appreciated from the above table that the DPP tracking system where three laser beams are directed onto optical disk 1 is employed in reproducing a signal from an AS-MO disk. The laser beam thereof has a wavelength of 635 nm. The DPD tracking system where a single laser beam is directed onto optical disk 1 is employed in reproducing a signal from a DVD. The laser beam thereof has a wavelength of 635 nm. When a signal is to be reproduced from a CD, the DPD tracking system where a single laser beam is directed onto optical disk 1 is employed. Here, the laser beam having a wavelength of 780 nm is employed.

(1) AS-MO disk

A signal reproduction operation from an AS-MO disk will be described first.

Figure 10:
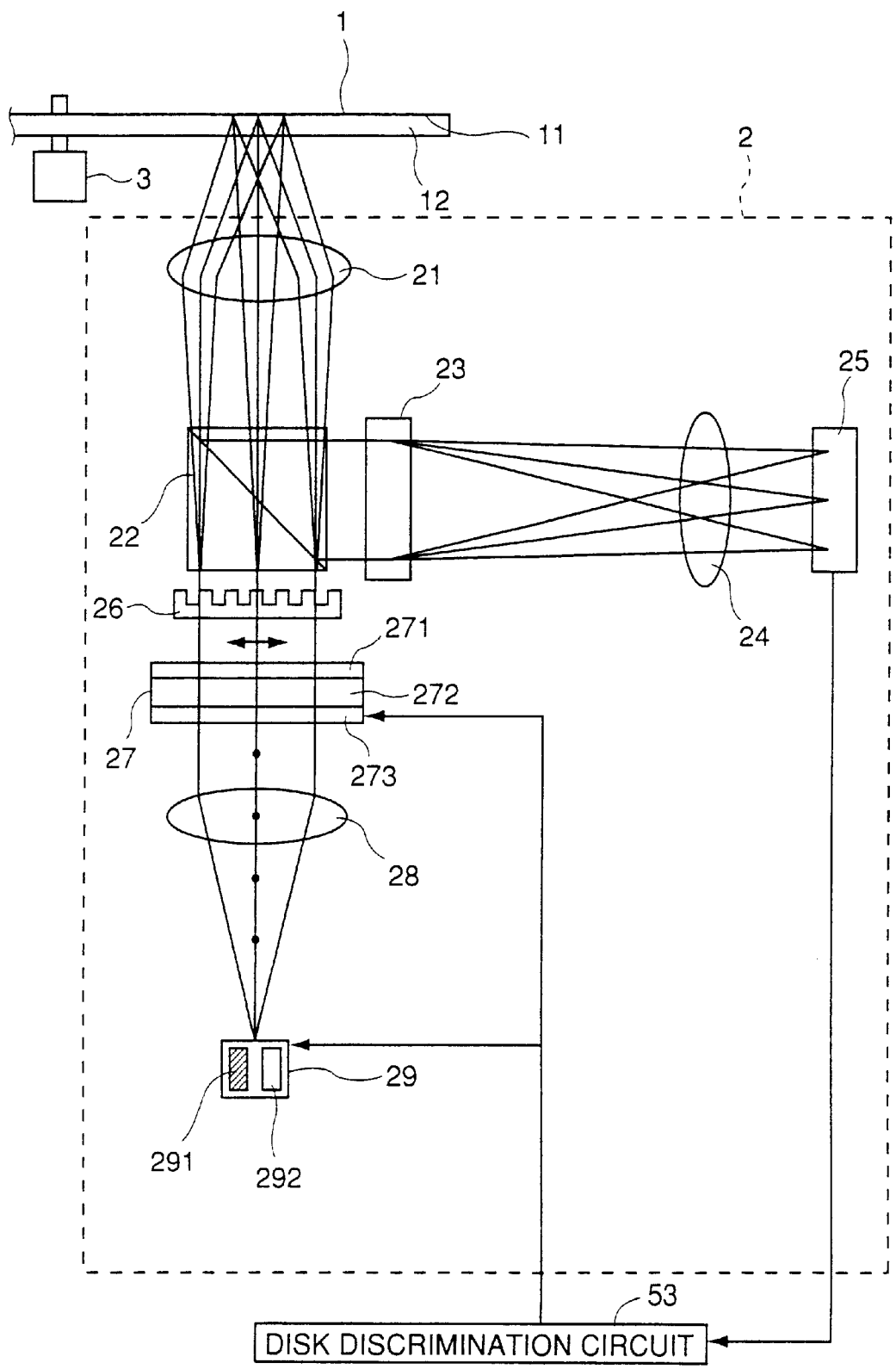
FIG. 10 shows a signal reproduction operation from an AS-MO disk by the optical pickup device of FIG. 3.

When an AS-MO disk 1 is mounted on spindle motor 3, disk discrimination circuit 53 recognizes that optical disk 1 is an AS-MO disk according to the detection signal from photodetector 25. Discrimination circuit 53 switches switching elements 54 and 57 shown in FIG. 7 to the AS-MO disk side, and drives oscillation device 291 that generates a laser beam of 635 nm in wavelength as shown in FIG. 10. In this case, discrimination circuit 53 does not apply a voltage across transparent electrodes 274 and 275 in polarization plane rotary unit 27.

A laser beam is generated that is polarized in a direction perpendicular to the paper plane of FIG. 10 from oscillation device 291. The generated laser beam is made parallel by collimator lens 28.

Since a voltage is not applied to transparent electrodes 274 and 275 in polarization plane rotary unit 27, the laser beam from collimator lens 28 is passed through having its plane of polarization rotated 90°. Therefore, a laser beam polarized in a direction parallel to the paper plane of FIG. 10 enters polarization selective diffraction grating 26. Since diffraction grating 26 functions as a diffraction grating with respect to a laser beam that is polarized in a direction parallel to the paper plane, the single laser beam is divided into 3 by diffraction grating 26. More specifically, the single laser beam is passed straight forward to form one main laser beam. At the same time, the single laser beam is diffracted in the left and right directions to form two sub laser beams. These three laser beams pass through half mirror 22 to be focused on signal recording face 11 on AS-MO disk 1 by objective lens 21.

Figure 11:
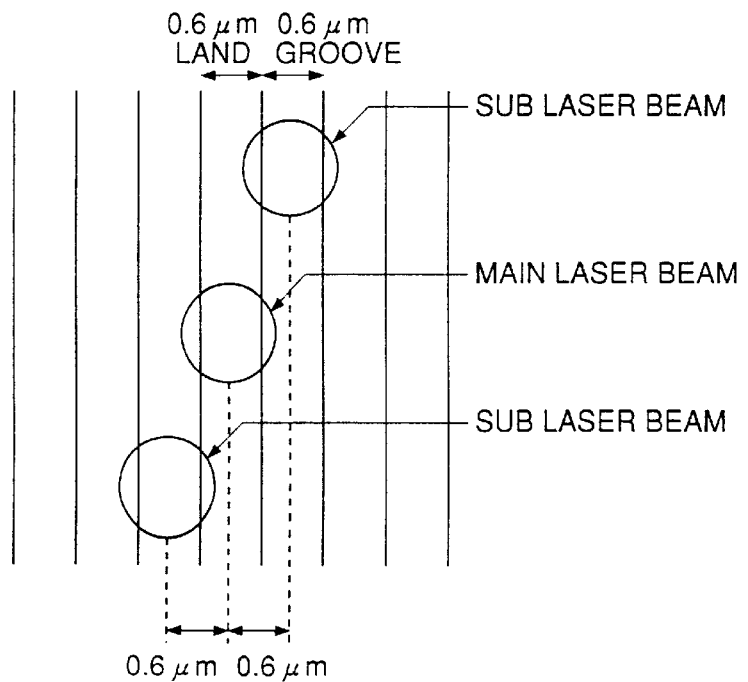
FIG. 11 is a plan view of an AS-MO disk to which three laser beams are directed according to the operation of FIG. 10.

As shown in FIG. 11, a track including a land and a groove is formed in a spiral manner in an AS-MO disk. Data is written into both the land and the groove. The land and the groove each have a width of 0.6 $\mu$m. The track pitch is 0.6 $\mu$m. In this DPP tracking system, the main laser beam is projected on the land (or groove), and two sub laser beams are projected on the grooves (or lands) located at both sides.

Referring to FIG. 10, the three laser beams reflected at signal recording face 11 are guided to Wollaston prism 23 by half mirror 22 through objective lens 21. The three laser beams that are polarized in predetermined directions are separated by Wollaston prism 23 into a laser beam including only the P polarization component, and a laser beam including only the S polarization component, and a laser beam mixed with the P and S polarization components. More specifically, the three laser beams aligned in the horizontal direction with respect to the paper plane of FIG. 10 are divided into three laser beams arranged in the vertical direction in FIG. 10. The total of nine laser beams are gathered by collective lens 24 to enter photodetector 25. Therefore, the center main laser beam having a mixture of P and S polarization components is directed to main sensor 251 of photodetector 25 shown in FIG. 6. The laser beam including only the P polarization component is directed to P polarization sensor 254. The laser beam including only the S polarization component is directed to S polarization sensor 255. The two sub laser beams are directed to sub sensors 252 and 253, respectively.

Tracking error signal TEp is generated by DPP tracking error signal generation circuit 51 according to detection signals A–H from main sensor 251 and sub sensors 252 and 253. Tracking error signal TEp is supplied to servo mechanism 4 via switching element 54. Reproduced signal RFmo is generated by subtractor 55 shown in FIG. 7 according to detection signals I and J from P polarization sensor 254 and S polarization sensor 255. Reproduced signal RFmo is supplied to shaper 8 via switching element 57. Optical pickup device 2 is shifted in a direction perpendicular to the track by servo mechanism 4 so that main laser beam is constantly directed on the land (or groove) of the AS-MO disk in response to tracking error signal TEp.

(2) DVD

A signal reproduction operation from a DVD will be described hereinafter.

Figure 12:
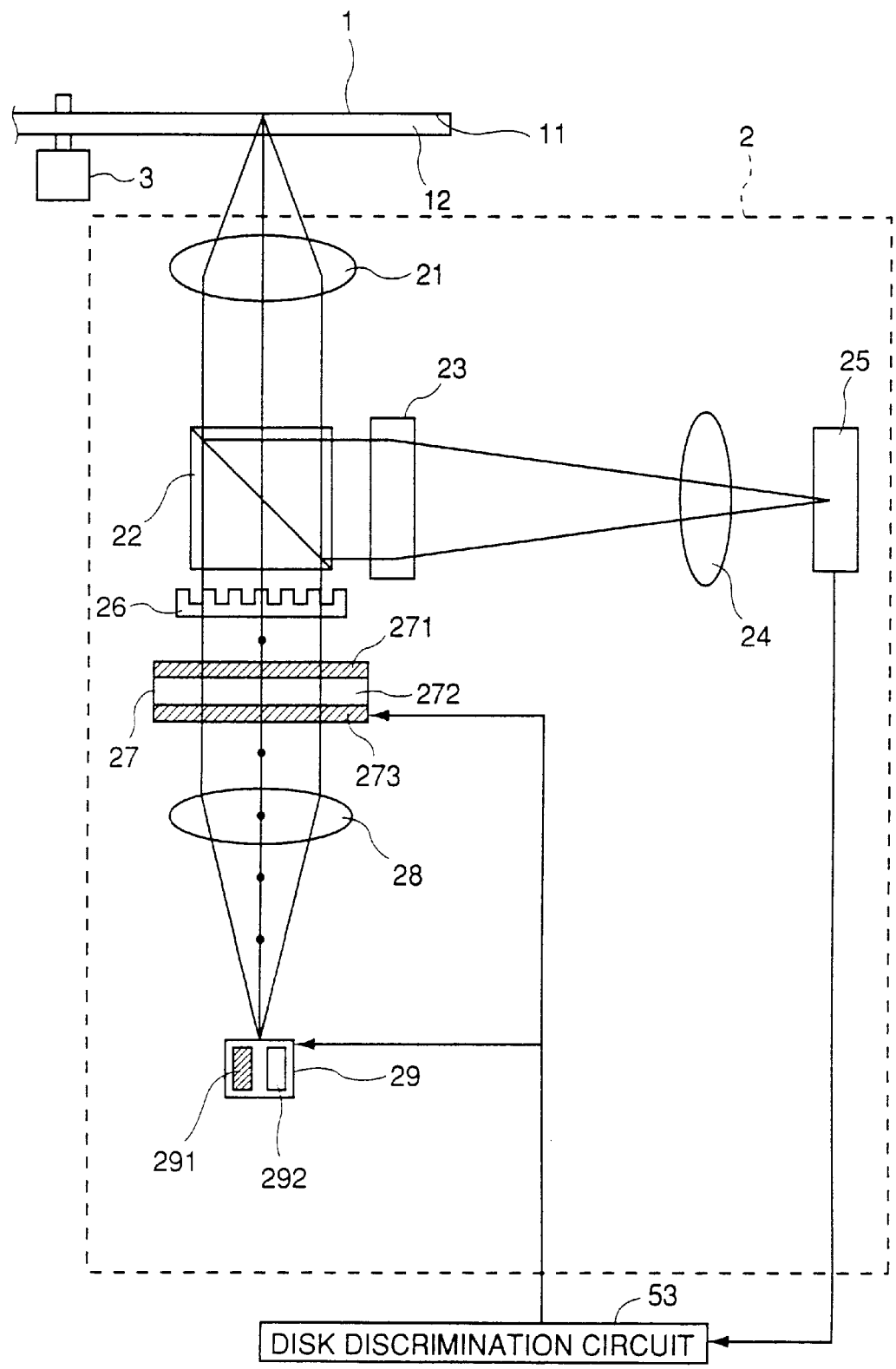
FIG. 12 shows a signal reproduction operation from a DVD by the optical pickup device of FIG. 3.

When a DVD is mounted, disk discrimination circuit 53 drives oscillation device 291 that generates a laser beam having a wavelength of 635 nm as shown in FIG. 12, similar to the above-described AS-MO disk. It is to be noted that discrimination circuit 52 switches switching elements 54 and 57 shown in FIG. 7 to the DVD/CD side, and applies a voltage to transparent electrodes 274 and 275 of polarization plane rotary unit 27.

Therefore, the laser beam that is polarized in a direction perpendicular to the paper plane of FIG. 12 passes polarization plane rotary unit 27 without rotating its plane of polarization. Since a laser beam that is polarized in a direction perpendicular to the paper plane enters polarization selective diffraction grating 26, diffraction grating 26 will not function as a diffraction grating. Therefore, the laser beam passes through diffraction grating 26 without being diffracted. As a result, a single laser beam is focused on a signal recording face 11 of DVD 1 by objective lens 21.

Figure 13:
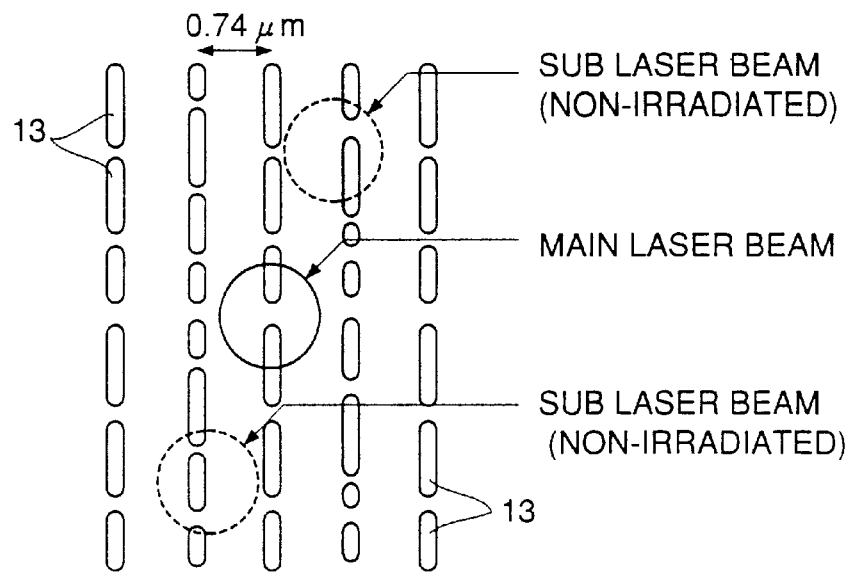
FIG. 13 is a plan view of a DVD to which a laser beam is directed according to the operation of FIG. 12.

In a DVD, a train of pits 13 forms a track as shown in FIG. 13. The track pitch is 0.74 µm. A single main laser beam is directed on pit 13. Since the laser beam is not divided into three laser beams, no sub laser beams will be projected.

The laser beam reflected at signal recording face 11 of DVD 1 enters main sensor 251 of photodetector 25, similar to the above-described AS-MO disk. Since a sub laser beam is not projected, no laser beam will enter sub sensors 252 and 253. Although the laser beam enters P and S polarization sensors 254 and 255, the detection signal therefrom will not be used.

Tracking error signal TEd generated by DPD tracking error signal generation circuit 52 according to detection signals C, D, E and F from main sensor 251 is supplied to servo mechanism 4 via switching element 54. Optical pickup device 2 is shifted in a direction perpendicular to the track by servo mechanism 4 so that the main laser beam is constantly directed on pit 13 of DVD 1 in response to tracking error signal TEd.

(3) CD

A signal reproduction operation from a CD will be described hereinafter.

When a CD is mounted, disk discrimination circuit 53 switches switching elements 54 and 57 to the DVD/CD side, as in the DVD. Disk discrimination circuit 53 drives oscillation device 292 that generates a laser beam having a wavelength of 780 nm as shown in FIG. 14.

In this case, no voltage is applied to transparent electrodes 274 and 275 in polarization plane rotary unit 27, as in the case of the above-described AS-MO disk.

Figure 14:
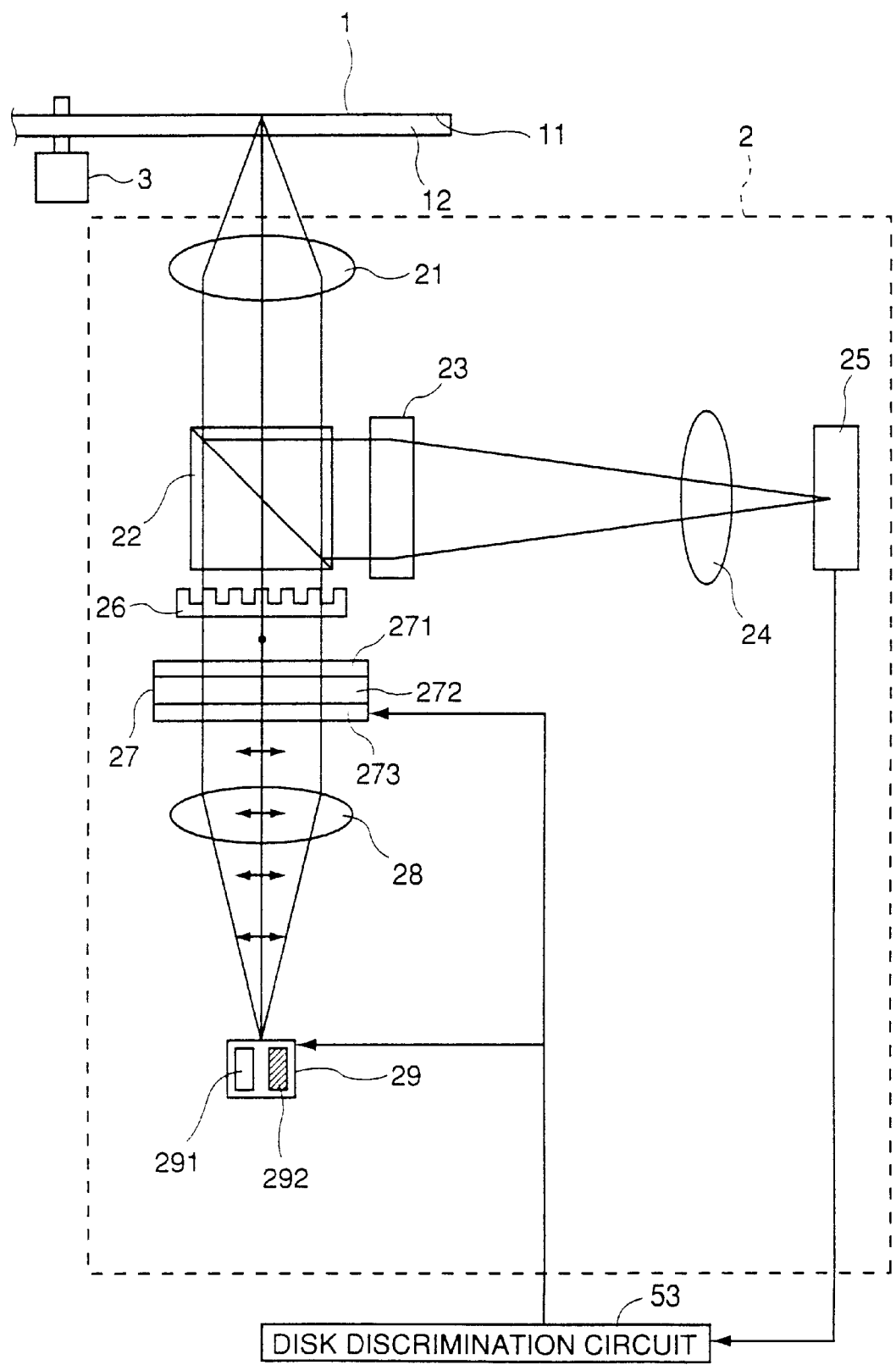
FIG. 14 shows a signal reproduction operation from a CD by the optical pickup device of FIG. 3.

Therefore, the laser beam polarized in a direction parallel to the paper plane of FIG. 14 is generated by oscillation device 292 to be made parallel by collimator lens 28 and then directed to polarization plane rotary unit 27.

Since a voltage is not applied to transparent electrodes 274 and 275 in polarization plane rotary unit 27, the incident laser beam has its plane of polarization rotated 90° and output from polarization plane rotary unit 27. As a result, a laser beam polarized in a direction perpendicular to the paper plane of FIG. 14 enters diffraction grating 26. Here, diffraction grating 26 will not function as a diffraction grating. Therefore, a single laser beam is focused on signal recording face 11 of CD 1 by objective lens 21.

Figure 15:
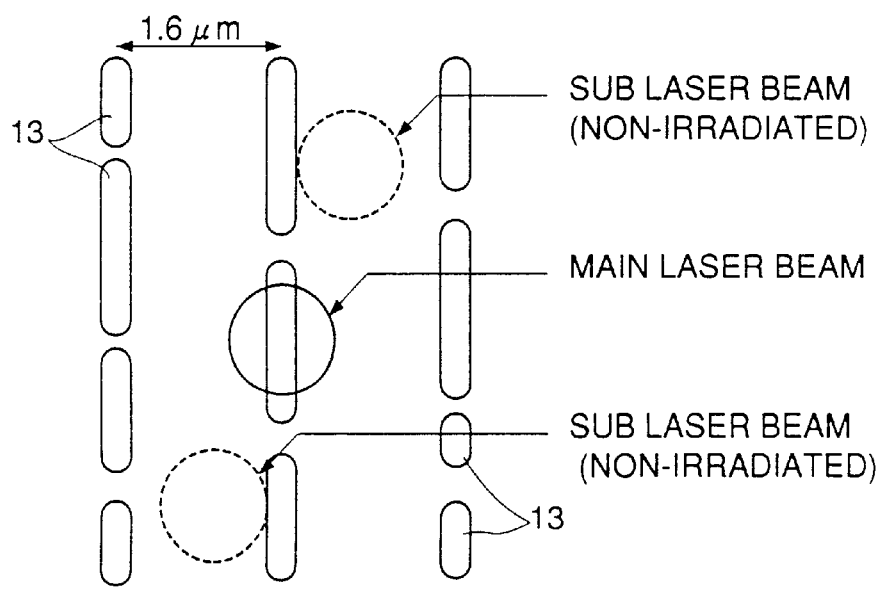
FIG. 15 is a plan view of a standard density CD to which a laser beam is directed according to the operation of FIG. 14.
Figure 16:
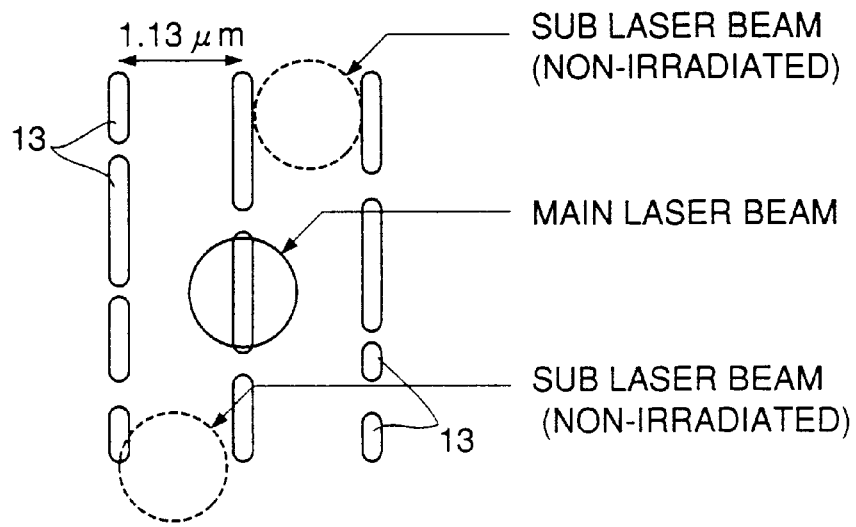
FIG. 16 is a plan view of a double density CD to which a laser beam is directed according to the operation of FIG. 14.
Figure 17:
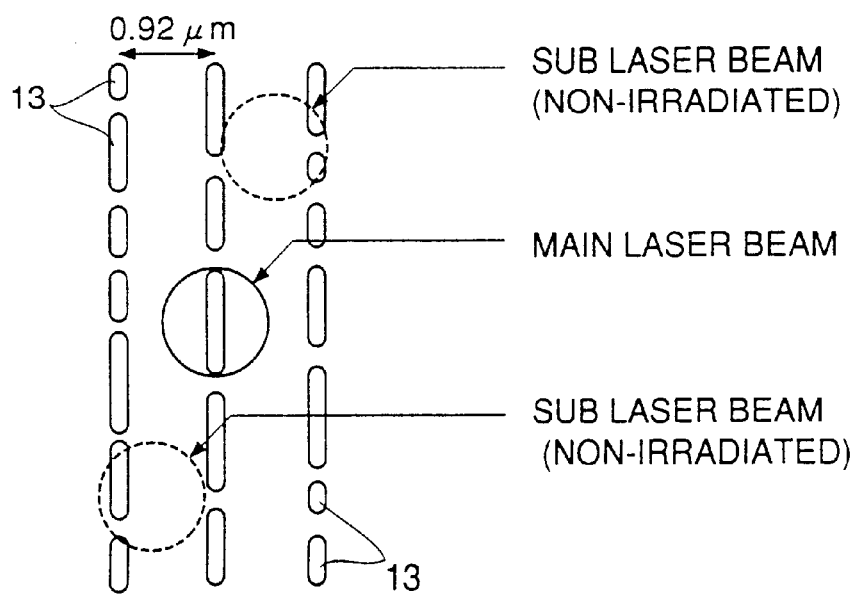
FIG. 17 is a plan view of a triple density CD to which a laser beam is directed according to the operation of FIG. 14.

In a CD, a train of pits 13 forms a track as shown in FIGS. 15–17. In a CD of the standard density shown in FIG. 15, the track pitch is 1.6 µm. In a CD of double density shown in FIG. 16, the track pitch is 1.13 µm. In the CD of triple density shown in FIG. 17, the track pitch is 0.92 µm. A single main laser beam is directed on pit 13 as shown in FIGS. 15–17. A sub laser beam will not be projected since the laser beam is not divided into 3 beams.

The single laser beam reflected at signal recording face 11 of CD 1 enters main sensor 251 of photodetector 25, as in a DVD. Therefore, a tracking error signal TEd is generated by DPD tracking error signal generation circuit 52 to be supplied to servo mechanism 4 via switching element 54. Optical pickup device 2 is shifted in the direction perpendicular to the track by servo mechanism 4 so that the main laser beam is constantly directed on the track of the CD in response to tracking error signal TEd.

Optical pickup device 2 according to the present embodiment provides tracking control according to the DPP method for an AS-MO disk, and according to the DPD method for a DVD or a CD. Therefore, a signal can be reproduced from three types of optical disks defining in the tracking system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device for a first optical disk according to a first standard and a second optical disk according to a second standard differing from said first standard, comprising:

a laser, and an optical device passing a laser beam from said laser to form one main laser beam and focusing only one main laser beam on said first optical disk in reproducing a signal from said first optical disk, and passing a laser beam from said laser to form one main laser beam and diffracting the laser beam from said laser to form first and second sub laser beams and focusing said one main laser beam and said first and second sub laser beams on said second optical disk in reproducing a signal from said second optical disk;

wherein said optical device comprises a polarization selective diffraction grating that passes said laser beam polarized in a first direction to form the one main laser beam, and passes said laser beam polarized in a second direction differing from said first direction to form the one main laser beam and diffracting the laser beam polarized in the second direction to form the first and second sub laser beams.

2. The optical pickup device according to claim 1, further comprising a polarization plane rotary unit arranged between said laser and said polarization selective diffraction grating to selectively rotate a plane of polarization of the laser beam from said laser.

3. The optical pickup device according to claim 2, wherein said polarization plane rotary unit comprises first and second transparent electrodes opposite to each other, and liquid crystal sandwiched between said first and second transparent electrodes.

4. The optical pickup device according to claim 1, wherein said laser comprises a first oscillation device oscillating a laser beam polarized in said first direction, and a second oscillation device oscillating a laser beam polarized in said second direction.

5. The optical pickup device according to claim 1, further comprising a photodetector detecting a laser beam reflected from said optical disk, wherein said photodetector comprises a main sensor detecting said main laser beam, a first sub sensor detecting said first sub laser beam, and a second sub sensor detecting said second sub laser beam.

6. The optical pickup device according to claim 1, further comprising:

a collimator lens collimating a laser beam from said laser, an objective lens focusing a laser beam from said optical device on said optical disk, a half mirror arranged between said laser and said objective lens, and a photodetector detecting a laser beam reflected from said optical disk and reflected from said half mirror.

7. An optical pickup device for a magneto optical disk, a digital video disk, and a compact disk, said optical pickup device comprising:

a laser including a first oscillation device oscillating a laser beam polarized in a first direction when reproducing a signal from said magneto optical disk or digital video disk, and a second oscillation device oscillating a laser beam polarized in a second direction substantially perpendicular to said first direction when reproducing a signal from said compact disk, a collimator lens collimating a laser beam from said laser, a polarization plane rotary unit passing a laser beam from said collimator lens without rotating its plane of polarization when reproducing a signal from said digital video disk, and rotating substantially 90° a plane of polarization of a laser beam from said collimator lens to pass the laser beam when reproducing a signal from said magneto optical disk or compact disc, a polarization selective diffraction grating passing the laser beam polarized in said first direction from said polarization plane rotary unit to form only one main laser beam when reproducing a signal from said digital video disk or said compact disk, and passing the laser beam polarized in said second direction from said polarization plane rotary unit to form one main laser beam and diffracting the laser beam to form first and second sub laser beams when reproducing a signal from said magneto optical disk, an objective lens focusing a laser beam from said polarization selective diffraction grating on said disk, and a photodetector detecting a laser beam reflected from said optical disk.

8. The optical pickup device according to claim 7, wherein said polarization plane rotary unit comprises first and second transparent electrodes opposite to each other, and liquid crystal sandwiched between said first and second transparent electrodes.

9. The optical pickup device according to claim 7, wherein said photodetector comprises a main sensor detecting said main laser beam, a first sub sensor detecting said first sub laser beam, and a second sub sensor detecting said second sub laser beam.

10. An optical disk recording/reproduction apparatus comprising an optical pickup device for a first optical disk according to a first standard and for a second optical disk according to a second standard differing from said first standard, said optical pickup device including:

a laser, an optical device passing a laser beam from said laser to form one main laser beam in reproducing a signal from said first optical disk, and passing a laser beam from said laser to form one laser beam and diffracting the laser beam to form first and second sub laser beams when reproducing a signal from said second optical disk, and a photodetector detecting a laser beam reflected from said optical disk, wherein said photodetector includes
a main sensor detecting said main laser beam,
a first sub sensor detecting said first sub laser beam,
a second sub sensor detecting said second sub laser beam, said optical disk recording/reproduction apparatus further comprising:

a first generation circuit generating a first tracking error signal in response to an output signal from said main sensor, a second generation circuit for generating a second tracking error signal in response to an output signal from said main sensor and said first and second sub sensors, and a servo mechanism shifting said optical pickup device in a direction substantially perpendicular to a track on said optical disk in response to said first or second tracking error signal.

11. The optical disk recording/reproduction apparatus according to claim 10, further comprising:

a discrimination circuit discriminating between said first and second optical disks, and a switching element selecting said first or second tracking signal to supply the selected signal to said servo mechanism according to a discrimination result of said discrimination circuit.

12. The optical disk recording/reproduction apparatus according to claim 11, wherein said optical device comprises a polarization selective diffraction grating passing said laser beam polarized in a first direction to form one main laser beam, and passing said laser beam polarized in a second direction differing from said first direction to form one main laser beam and diffracting the laser beam to form first and second sub laser beams, said optical pickup device further including a polarization plane rotary unit arranged between said laser and said polarization selective diffraction grating to selectively rotate a plane of polarization of a laser beam from said laser, wherein said polarization plane rotary unit comprises first and second transparent electrodes opposite to each other, and liquid crystal sandwiched between said first and second transparent electrodes, wherein said discrimination circuit selectively applies a voltage to said first and second transparent electrodes.

* * * * *